(12) United States Patent
Chien et al.

(10) Patent No.: US 8,580,144 B2
(45) Date of Patent: Nov. 12, 2013

(54) BLUE PHASE LIQUID CRYSTAL NANOCOMPOSITES AND DEVICES CONTAINING THE SAME

(75) Inventors: Liang-Chy Chien, Hudson, OH (US); Jeoung Yeon Hwang, Dajeon (KR); Jenny-Marie Wong, Tonawanda, NY (US)

(73) Assignee: Kent State University, Kent, OH (US)

( * ) Notice: Subject to any disclaimer, the term of this patent is extended or adjusted under 35 U.S.C. 154(b) by 0 days.

(21) Appl. No.: 13/441,027

(22) Filed: Apr. 6, 2012

(65) Prior Publication Data

US 2012/0262662 A1     Oct. 18, 2012

Related U.S. Application Data

(60) Provisional application No. 61/517,190, filed on Apr. 15, 2011.

(51) Int. Cl.
| | |
|---|---|
| C09K 19/52 | (2006.01) |
| C09K 19/06 | (2006.01) |
| C09K 19/32 | (2006.01) |
| C09K 19/00 | (2006.01) |
| C09K 19/08 | (2006.01) |
| G02F 1/1333 | (2006.01) |

(52) U.S. Cl.
USPC ............... 252/299.01; 252/299.5; 252/299.6; 428/1.1; 349/182; 349/186; 977/700

(58) Field of Classification Search
USPC ............... 252/299.01, 299.5, 299.6; 428/1.1; 349/182, 186; 977/700
See application file for complete search history.

(56) References Cited

U.S. PATENT DOCUMENTS 8,071,181 B2 * 12/2011 Hegmann et al. .............. 428/1.1
8,323,755 B2 * 12/2012 Hegmann et al. .............. 428/1.3

OTHER PUBLICATIONS

Meiboom S. et al, "Theory of the Blue Phase of Cholesteric Liquid Crystals", Physical Review Letters, May 4, 1981, vol. 46, No. 18, The American Physical Society.
Kitzerow, Heinz-S., "Blue Phases at Work!", Wiley InterScience, pp. 63-66, 2006 Wiley-VCH Verlag GmbH & Co., KGaA, Weinheim.
De Gennes, P. G. et al, "Blue Phases", The Physics of Liquid Crystals, Second Edition, Oxford Science Publications (Oxford University Press, 1993), Chapter 6, Cholesteric Liquid Crystals, Sec. 6.5, pp. 320-336.
Bhatt, J. C. et al., "Synthesis of Highly Chiral Multisubstituted Binaphthyl Compounds as Potential New Biaxial Nematic and NLO Materials", Liquid Crystals, 1995, vol. 18, No. 3, pp. 367-380, Taylor & Francis, London W1T 3JH, United Kingdom.

* cited by examiner

*Primary Examiner* — Geraldina Visconti
(74) *Attorney, Agent, or Firm* — Hudak, Shunk & Farine Co., LPA

(57) ABSTRACT

A composition including nanocomposites formed from blue phase liquid crystals that are stabilized with dopants and nanorods such as metallic nanorods and/or carbon nanotubes. Devices including the compositions are disclosed that provide increases temperature ranges as well as reduction in threshold voltage and turn on voltage, in addition to the inherent blue phase liquid crystal properties of sub-millisecond response time in the field induced Kerr effect.

20 Claims, 4 Drawing Sheets

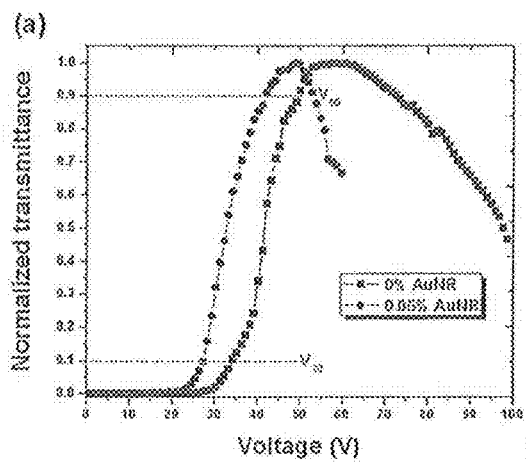
FIG. 3(a)
FIG. 3(b)
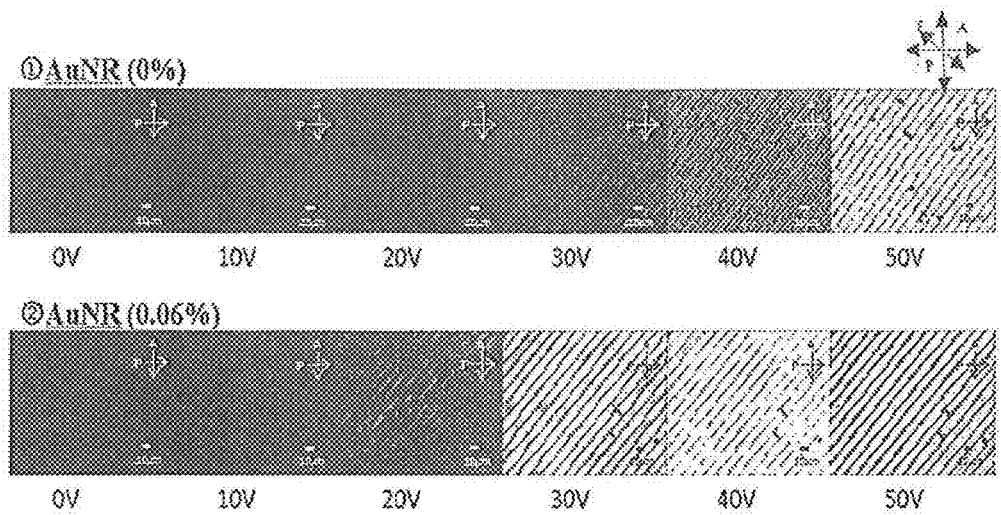
FIG. 3(c)

BLUE PHASE LIQUID CRYSTAL NANOCOMPOSITES AND DEVICES CONTAINING THE SAME

CROSS REFERENCE

This application claims the priority filing date of U.S. Provisional Application Ser. No. 61/517,190 filed Apr. 15, 2011 for BLUE PHASE LIQUID CRYSTAL NANOCOMPOSITES AND DEVICES, herein fully incorporated by reference.

This invention was made with government support under NSF Contract No. CHE1004987 and AFOSR Contract No. AF05-T029. The Government has certain rights in the invention

FIELD OF THE INVENTION

The present invention relates to compositions including blue phase liquid crystals that are formed from nematic liquid crystals and chiral dopants and stabilized with nanorods. Devices including the compositions are disclosed that provide increased temperature ranges as well as a reduction in threshold voltage and turn on voltage, in addition to the inherent blue phase liquid crystal properties of sub-millisecond response time in the field induced Kerr effect.

BACKGROUND OF THE INVENTION

Blue phase (BP) liquid crystals (LC) are self-aligned structures found within a narrow temperature range between cholesteric and isotropic phases, see Meiboom, S. S., J. P.; Amderson, P. W.; Brinkman, W. F., Phys. Rev. Lett. 1981, 46, 1216. Previous research characterizes HPLC as a small doubly twisted structure stabilized by the existence of disclination lines, see Kiterow, H. S., Blue Phases at Work! ChemPhysChem 2006, (7), 63-66. Based on the packing structure of the cubic lattice, HPLC is further classified into three categories: BPI, BPII, and BPIII corresponding to body-centered, simple cubic, and an isotropic phase with uniform symmetry. Research in HPLC has been of interest in the application of displays due to the elimination of the alignment layer during processing, and response time in the μs range, see Meiboom and Kitzerow, supra.

SUMMARY OF THE INVENTION

It is an object of the present invention to provide a blue phase liquid crystal (HPLC) composition comprising of nematic liquid crystals, chiral dopants and nanorods such as metallic, metal oxide or semiconductor nanorods and carbon nanotubes.

Yet another object is to provide blue phase liquid crystal compositions comprising a mixture of chiral dopants and nematic liquid crystals that have voids therein such as empty spaces and disclination lines, and nanorods that can reside in the empty spaces and/or disclination lines.

Still another object of the present invention is to provide a blue phase liquid crystal nanocomposition having an increased temperature range.

Yet another object, of the present invention is to provide devices containing a blue phase liquid crystal nanocomposition that offer the advantages of a fast switching time and require a lower applied voltage than corresponding pure blue phase liquid crystals without doping.

An additional object of the present invention is to provide electrically-driven devices containing the blue phase liquid crystal nanocomposition, for example, spatial light modulators, active optical elements, and displays.

Yet another object of the present invention is to provide liquid crystal devices that do not require an alignment layer.

In one aspect of the invention a blue phase liquid crystal composition is disclosed, comprising a blend of nematic liquid crystals and at least a chiral dopant in an amount from about 5 to about 90 parts by weight per 100 parts by weight of the nematic liquid crystal; and nanorods, in an amount from about 0.000001 to about 10 parts by weight per 100 parts by weight of the nematic liquid crystal and chiral dopant.

Another aspect of the invention is a blue phase liquid crystal composition, comprising nematic liquid crystals doped with a chiral dopant, said blue phase liquid crystals having voids in the lattice structure thereof, and nanorods located in the voids.

A further aspect of the invention is an electro-optical device, comprising a liquid crystal composition comprising nematic liquid crystal; at least one chiral dopant in an amount from about 5 to about 90 parts by weight per 100 parts by weight of the nematic liquid crystal; and nanorods in an amount from about 0.000001 to about 10 parts by weight per 100 parts by weight of nematic liquid crystal and chiral dopant.

BRIEF DESCRIPTION OF DRAWINGS

FIG. 3 shows the transmittance-voltage (TV) curve of pure. HPLC and 0.06% AuNR HPLC device (a); the plot of the TV curve shows the 0.06% AuNR HPLC sample having a decrease in the threshold voltage (Vth); wherein the POM images of 0.06% AuNR HPLC (b) and pure HPLC samples (c) with applied voltages from 0 V to 50 V at the same HPLC temperature (50° C.)

DETAILED DESCRIPTION OF THE INVENTION

Figure 1A:
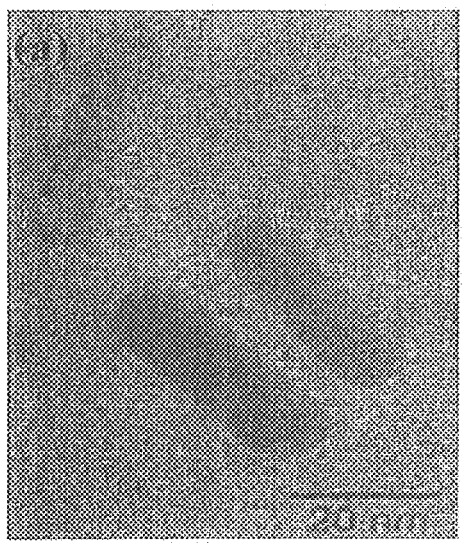
FIG. 1 shows a TEM image of organo-thio monolayer protected AuNR in dichloromethane DCM (a), POM images of pure HPLC (b), and 0.06% AuNR HPLC (c) before the appearance of the cholesteric phase during cooling, wherein 0.06% AuNR HPLC shows red domains indicating the elongation of the BP cubic lattice.

Nematic liquid crystals are doped with chiral dopants and stabilized with nanorods, preferably gold nanorods, to form a blue phase liquid crystal nanocomposite.

Blue phase liquid crystals of the invention are types of liquid crystals that reside in a narrow temperature range between a cholesteric phase and an isotropic phase. Blue phase liquid crystals are generally characterized as having a double-twist three dimensional, crystal-like lattice structure. Three types of lattice structures are generally known, BP-I, a body central cubic; BP-II, a simple cubic; and BP-III, an isotropic phase with uniform symmetry. See De Gennes, P. G. and Prost, J. *The Physics of Liquid Crystals*, $2^{nd}$ ed., Clarendon press: Oxford, (1993). These types of liquid crystals have voids therein that include empty spaces as well as defects or disclinations that are believed to be formed where two or more blue phase liquid crystals are in contact. An advantage of using blue phase liquid crystals in a liquid crystal cell is that no surface alignment layers are necessary, thereby reducing manufacturing steps and production costs. That is, the liquid crystal cell is free of an alignment layers.

Blue phase liquid crystals are known to the literature and to the art and are commercially available from various sources, for example Merck and also from Chisso of Japan. The blue phase liquid crystals are prepared by combining a nematic liquid crystal with a chiral dopant to form a mixture that has a low viscosity, high birefringence and is a dielectric anisotropy eutectic. Such mixtures are available as BL006 or MLC 6080 from Merck. Other blue phase liquid crystals are known to the art and to the literature and are commercially available and the present invention encompasses the same.

As noted above, blue phase liquid crystals are formed by combining or blending a nematic liquid crystal with a chiral dopant in any suitable manner such as heating the mixture to the clear temperature of the mixture or by shaking. The typical chiral dopants of the present invention are generally one or more of binaphthal derivatives, sorbitol derivatives; and the like. Chiral dopants and mixtures of chiral dopants are known to the art and are available from Merck, for example as C15, CB15, S-/R-811, and S-/R-1011. The amount of chiral dopant ranges in an amount generally from about 5 to about 90 parts, desirably from about 10 to about 70 parts, and preferably from about 20 to about 60 parts per 100 parts by weight of the nematic liquid crystal.

The generic chemical structure of the chiral binaphthal dopants compounds has the following formula:

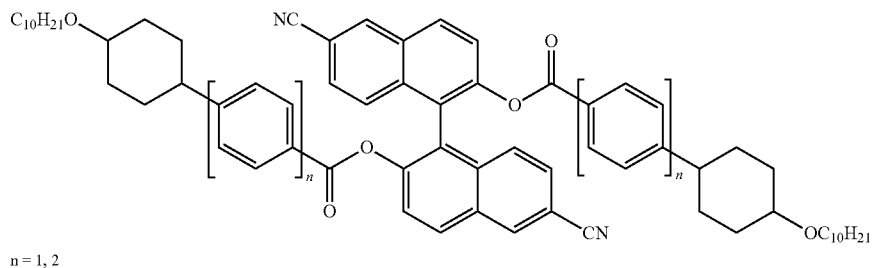

n = 1, 2 wherein CN can be replaced with C1-C20, OC1-OC20, F, F—C1-FC20, Cl, Br.

Specific examples of such binaphthal dopants including compounds having the identification numbers 51059, 51081, 82215, 51255, 51306, 51307, 51511, 51513 and 76307. The specific formulas thereof are as follows:

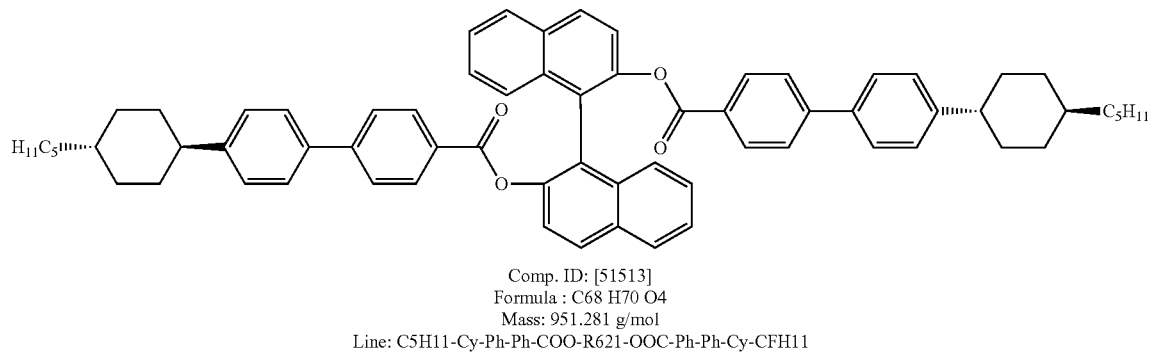

Comp. ID: [51513]
Formula : C68 H70 O4
Mass: 951.281 g/mol
Line: C5H11-Cy-Ph-Ph-COO-R621-OOC-Ph-Ph-Cy-CFH11

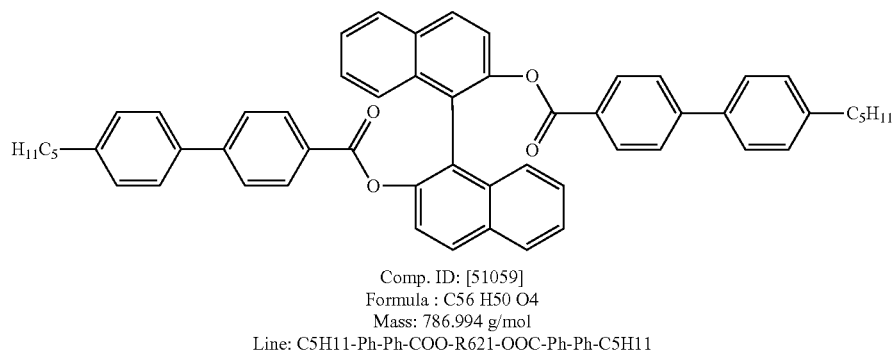

Comp. ID: [51059]
Formula : C56 H50 O4
Mass: 786.994 g/mol
Line: C5H11-Ph-Ph-COO-R621-OOC-Ph-Ph-C5H11

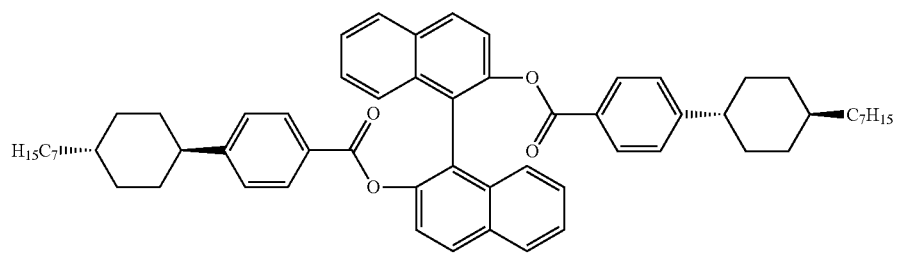
Comp. ID: [51081]
Formula : C60 H70 O4
Mass: 855.195 g/mol
Line: C7H15-Cy-Ph-COO-R621-OOC-Ph-Cy-C7H15
{chiral (R or S)}
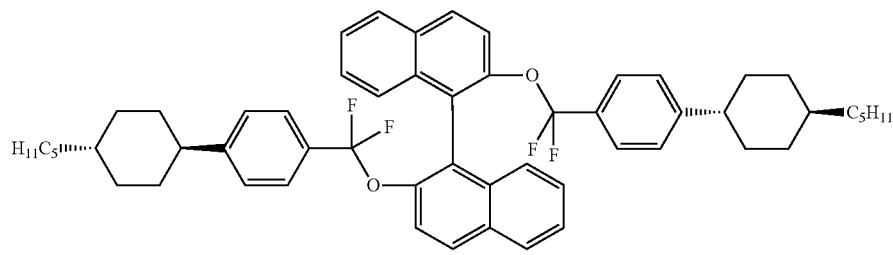
Comp. ID: [82215]
Formula : C56 H62 F4 O2
Mass: 843.084 g/mol
Line: C5H11-Cy-Ph-CF2-O-R621-O-CF2-Ph-Cy-C5H11
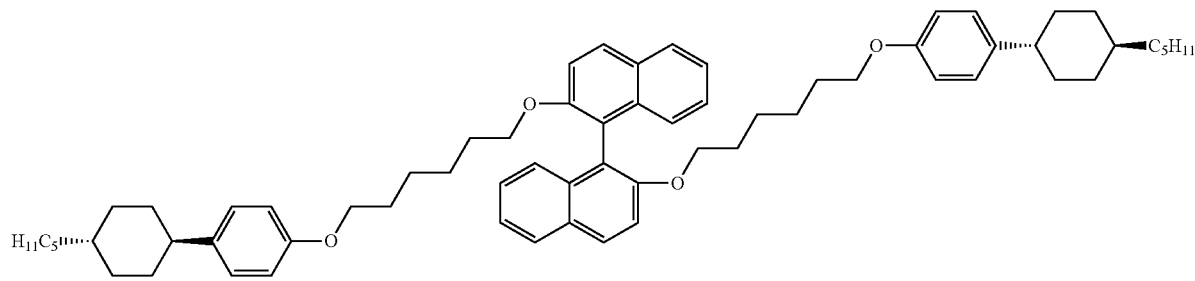
Comp. ID: [76307]
Formula : C66 H86 O4
Mass: 943.387 g/mol
Line: C5H11-Cy-Ph-O-C6H12-O-R621-O-C6H12-O-Ph-Cy-C5H11
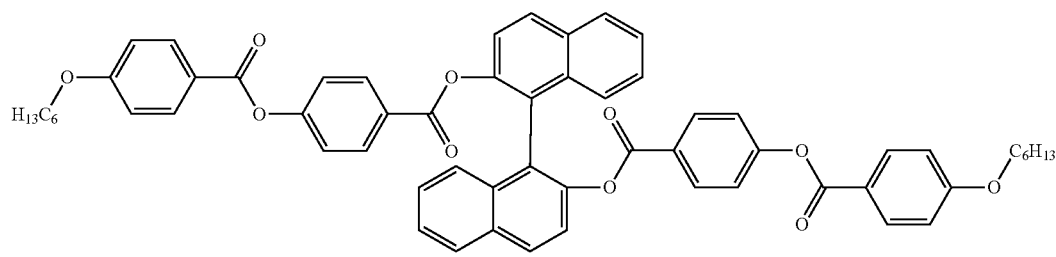
Comp. ID: [51255]
Formula : C60 H54 O10
Mass: 935.065 g/mol
Line: C6H13-O-Ph-COO-Ph-COO-R621-OOC-Ph-COO-Ph-O-C6H13

-continued

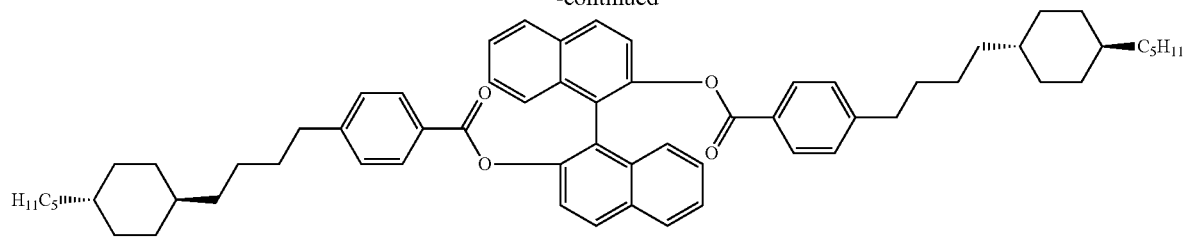

Comp. ID: [51306]
Formula : C64 H78 O4
Mass: 911.302 g/mol
Line: C5H11-Cy-C4H8-Ph-COO-R621-OOC-C4H8-Cy-C5H11

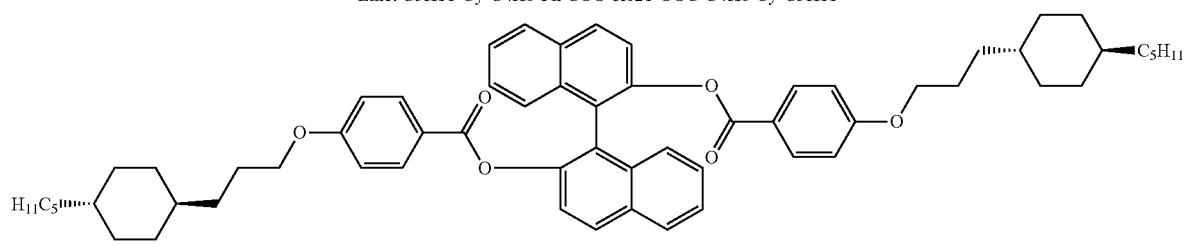

Comp. ID: [51307]
Formula : C62 H74 O6
Mass: 915.247 g/mol
Line: C5H11-Cy-C3H6-O-Ph-COO-R621-OOC-Ph-O-C3H6-Cy-C5H11

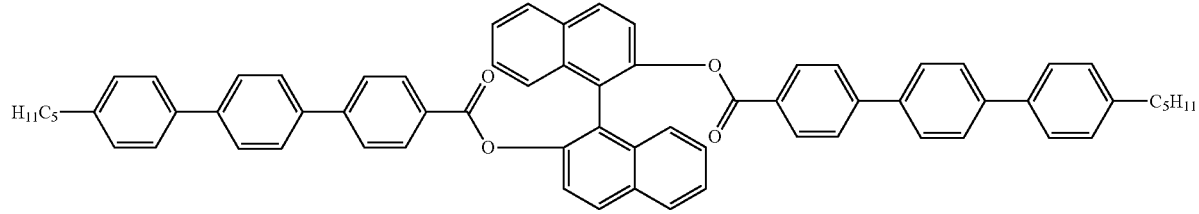

Comp. ID: [51511]
Formula : C68 H58 O4
Mass: 939.186 g/mol
Line: C5H11-Ph-Ph-Ph-COO-R621-OOC-Ph-Ph-Ph-C5H11

Nanorods are added to the blue phase liquid crystal mixture to stabilize the same. Nanorods include metal oxide nanorods, metallic nanorods, semiconductor nanorods, and carbon nanotubes. Examples of metal oxides nanorods include alumina nanorods, magnesium oxide nanorods, manganese oxide nanorods, titanium dioxide nanorods, and zinc oxide nanorods. Examples of metallic nanorods include iron, copper, zinc, silver, bismuth nanorods, cadmium selenide nanorods, gallium nitride nanorods, gallium phosphide nanorods, germanium nanorods, indium phosphide nanorods, nickel nanorods, palladium nanorods, platinum nanorods, silicon nanorods, and silicon carbide nanorods, with gold nanorods (AuNR) being preferred. Semiconductor nanorods are known to the art and to the literature and include cadmium telluride (CdTe) and cadmium sulfide (CdS). Such nanorods are available from 1 nm to 5 µm in length, desirably from about 1 to about 200 nm, and preferably about 20 to about 100 nm; or about 30 nm in length in one embodiment with the proviso that the length is greater than the diameter. In one embodiment, the diameter ranges from about 1 to about 50 nm, desirably from about 1 to about 10 nm, and preferably from about 2 nm to about 10 nm. Nanorods also include carbon nanotubes that have a length of from about 1 nm to about 5,000 nm, and desirably from about 1 nm to about 500 nm. The diameter of the nanotubes is generally from about 2 nm to about 100 nm, desirably from about 2 nm to about 50 nm, and preferably from about 0.2 nm to about 20 nm. Carbon nanotubes are known to the art and to the literature and are commercially available from Sigma-Aldrich.

The nanorods (i.e. metallic, metal oxide, semiconductor and carbon nanotubes) are added to the blue phase liquid crystal by any suitable method. For example, the nanorods can be mixed or suspended in an appropriate solvent such as a nontoxic organic or aqueous solvent, depending on their surface modifying compound. Examples of suitable solvents include alcohol, acetone, and hexane. The nanorod-solvent mixture can then be added to the blue phase liquid crystal-mixture followed by evaporation of organic solvent under reduced pressure such as a vacuum. The amount of nanorods utilized ranges generally from about 0.000001 to about 10 parts, desirably from about 0.0001 to about 1 part, and preferably from about 0.001 to about 0.5 part per 100 parts by weight of blue phase liquid crystal and chiral dopant.

Another aspect of the present invention is the utilization of polymer networks to stabilize the nanorod-doped blue phase liquid crystals. That is, the morphology of a nanorod-doped blue phase liquid crystal blend is preserved by the polymer network. The polymer networks are formed from a reactive monomer containing a mixture of multifunctional monomers as well as monofunctional monomers such that an appropriate functionality exists, i.e. a mixture of monofunctional to multifunction monomer ranging from about 1.01 to about 3.0 by weight and preferably from about 0.01 to about 10% by weight. The total amount of monomers generally ranges from about 0.01% to about 80.0% and desirably from about 0.01% to about 10% by the weight of the nematic liquid crystals and the chiral dopant.

Photoinitiators are generally utilized to polymerize the monomers with the amount of photoinitiator range from about 0.02% to about 2% by weight of the reactive monomer weight.

The polymerization can be carried out as follows. The reactive monomer and photoinitiator are dissolved in a small amount of a low boiling point organic solvent, for example acetone or methylene chloride and mixed with the nanorod-doped HPLCC. After evaporating the solvent under reduced pressure, the nanorod-doped HPLC is mixed, for example by shaking on a vortex mixer or in an ultrasonic cleaner bath for about half an hour at room temperature. The mixture is poured into an electro-optical cell. The polymer networks are formed by placing an LC cell containing the reactive monomers-HPLC mixture under ultraviolet light (from about 200 to about 400 nanometers) exposure for a length range from about 1 to about 30 minutes, depending on the wavelength and intensity of the light source to form a polymer-stabilized nanorod-doped-HPLC nanocomposite. It is believed that at least some of the nanorods are trapped or located in the disclination lines or areas of the cubic lattice. The expansion of the blue phase liquid crystal temperature range is due to the stabilization of defect regions by the nanorods such as AuNRs or carbon nanotubes.

Examples of reactive multifunctional monomers include di-, tri-, tetra-, dipentaerythritol penta acrylate or methacrylate, vinyl ether, or vinyl acetate. Examples of monofunctional monomers include alkyl acrylate, or alkyl methacrylate wherein the alkyl group has from 1 to about 20 carbon atoms.

The nanorod-doped blue phase liquid crystal compositions or composites can be utilized in electro-optical devices. In various embodiments, the devices generally include a pair of substrates that can be curved but preferably are planar and disposed parallel to each other in one embodiment. The substrates are maintained at a desired distance by a suitable spacer. An electrode layer can be present on one or more of the substrates. The nanorod-dopant blue phase liquid crystal composition is present between the substrates.

Various materials can be utilized as a substrate, such as glass, quartz, metal foil, paper, fabric or plastic, with glass being preferred. In various embodiments the substrates are transparent or substantially transparent where optical transmission is important.

The electrode layers can be deposited upon a substrate by any known means or methods. In one embodiment, the electrode layer material is a substantially transparent conductive material. Examples of suitable materials include metal oxides such as indium tin oxide and indium zinc oxide, carbon nanotubes, graphene, conductive polymers and preferably is indium tin oxide.

The blue phase liquid crystals stabilized with the nanorods can be utilized in numerous applications, for example electro-optical devices that can benefit from the doped blue phase liquid crystal compositions including electrically driven liquid crystal spatial light modulators, lenses, lens array, photonic crystal fibers, active optical elements and displays.

As set forth in the examples below, the nanorod stabilized liquid crystal nanocomposites of the present invention show that the blue phase (nematic liquid crystal and dopant) liquid crystal temperature range was increased with increasing concentration of nanorods (metallic, metal oxide, semiconductor and carbon nanotubes) in the blue phase liquid crystal composition. Devices including the blue phase liquid crystal nanocomposites also exhibit reduction in threshold voltage and turn on voltage, in addition to retaining the inherent property of sub-millisecond response time in the field-induced optical Kerr effect.

While the following examples serve to explain and illustrate the various embodiments of the present invention, they do not limit the same.

EXAMPLES

AuNR stabilized HPLCs have the blue phase temperature expansion up to 3 degrees Celsius. An example of voltage reduction was achieved, where electro-optical studies indicate a reduction in both the operational voltage (V10=27.3 V, V10: voltage required for 10% transmission) and the turn on voltage (V90=41.9 V, V90: voltage required for 90% transmission) for the 0.06% AuNRs doped BP sample compared to the operational voltage (V10=34.6 V) and the turn on voltage (V90=49.4 V) of the pure HPLC. The measured response time of the non-doped HPLC is 3.8 ms with the rise time of 2.1 ms (switched between $V_{10}$ and $V_{90}$) and the fall time of 1.7 ms (switched between $V_{90}$ and $V_{10}$), while the measured response time for the 0.06% AuNR doped HPLC is slightly higher at 21.2 ms with the rise time of 15.3 ms and the fall time of 5.9 ms.

A nanorod-dopant HPLC composite was prepared using a nematic LC (55.0% of BL006, Merck), AuNR nanorods, and a chiral dopant (45.0% of R811, Merck). The addition of AuNR, 10 μm in diameter and ~30 μm in length, was aimed to increase the BP temperature range, and lower the operating voltage of the BP mode device. The doped HPLC mixtures were prepared by adding 0.004%, 0.01%, 0.06%, and 0.6% of AuNR in the BP mixture, while keeping the nematic and chiral dopant at a constant 1:0.8 ratio. Due to the difficulty of mixing nanorods, AuNR were dispersed in dichloromethane (DCM) and mixing on a microbalance after the evaporation of solvent. AuNR were transferred in to sample vials and weighed with a microbalance capable of accuracy up to one microgram before the addition of the LC and chiral dopant to reduce the evaporation of the LC. Temperature range studies were conducted with imaging through a polarization microscope (POM). All samples were heated to the isotropic phase and cooled to room temperature at a rate of −0.2° C./min to room temperature. The blue phase temperature ranges for pure and doped BPs are summarized in Table 1.

TABLE 1

The temperature range of BPLC nanocomposites.

| Mixture | Wt. % AuNRs | Temperature Range | ΔT |
|---|---|---|---|
| 1 | 0% | 43.9-55.9° C. | 12.0° C. |
| 2 | 0.004% | 43.6-58.8° C. | 15.2° C. |
| 3 | 0.06% | 43.6-58.53° C. | 14.9° C. |
| 4 | 0.6% | 42.8-57.2° C. | 14.4° C. |

Prior to filling cells, samples were agitated in a sonicator at a constant temperature of 30° C. for 90 minutes. Through the use of capillary action the HPLC samples were filled at an isotropic state and allowed to slowly cool to the cholesteric phase. Temperature and reflection spectra measurements were obtained in glass cells with a cell gap of 10 μm using, ball spacers to separate the glass substrates. Electro-optical measurements; required the use of in-plane-switching (IPS) cells with patterned indium tin oxide (ITO) of 5 μm electrode line and 5 μm electrode space on one glass substrate. The IPS cells were assembled with another glass substrate without ITO electrode and using ball spacers to separate the glass substrates with a cell gap of 5 μm (5/5/5).

The field-induced optical Kerr effect was studied to determine the threshold voltage ($V_{th}$) and transmittance-voltage (TV) curve at a constant BP state at 50° C.

Figure 1B:
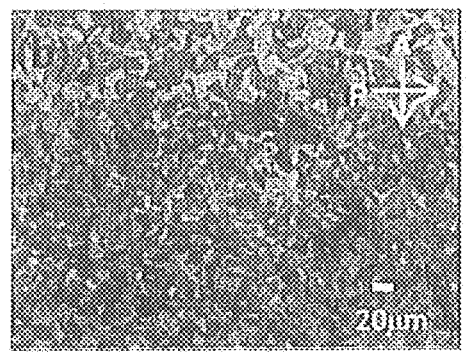
Figure 1C:
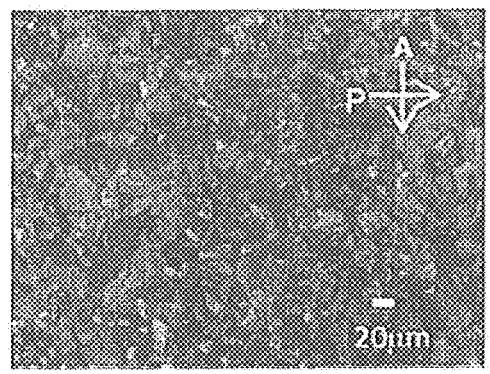

FIG. 1 shows the doped HPLC samples exhibited red colored domains, which is not observed in the pure BP sample. POM images were acquired as pure HPLC and doped HPLC samples were cooled at a rate of −0.2° C./min from the isotropic state. It was observed that colored domains in pure HPLC were smaller in size and nucleated at lower temperatures in comparison to the doped HPLC samples, while the temperature of the appearance of the cholesteric phase were approximately the same. Colored domains gradually grew to fill in the field of view as the temperature decreased. The 0.06% AuNR HPLC sample exhibited the highest concentration of red before the appearance of the cholesteric phase change. The red coloring observed in AuNR samples is believed to be attributed to the elongation of cubic lattice.

Figure 2A:
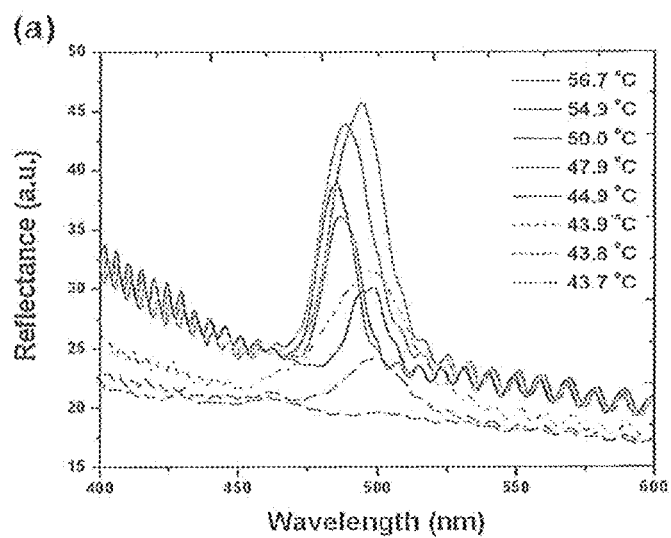
FIG. 2 shows the reflection spectra for pure HPLC (a), and 0.06% AuNR HPLC (b) showing a shift to longer wavelengths, independent of the temperature variation; and a comparison of peak maximums as a function of temperature for all concentrations of doped. AuNRs investigated (c)
Figure 2B:
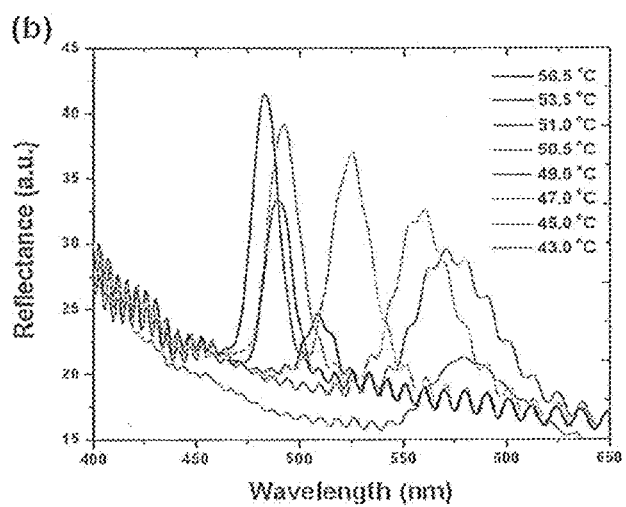
Figure 2C:
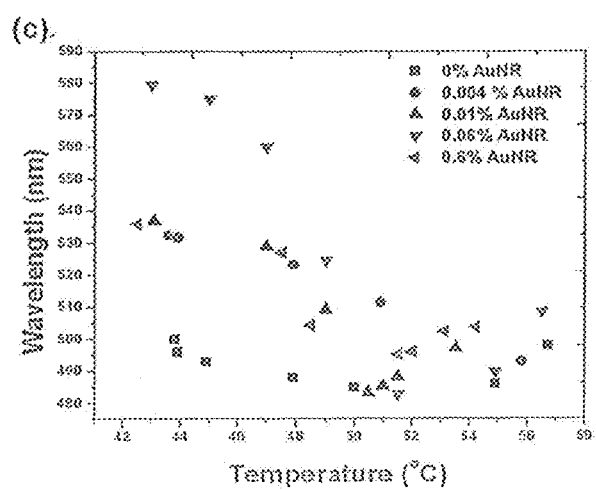

FIG. 2 shows the reflection spectra of pure HPLC and doped HPLC while cooling the samples at a rate of −0.2° C./min. Reflection spectra of the samples were studied as the temperature was varied. A shift was observed to longer wavelengths in the doped HPLC samples with respect to the pure HPLC FIG. 2a, which is independent of the temperature. The longest shift was noticed in 0.06% AuNR HPLC, which supports the reported POM image. The highest concentration of 0.6% AuNR HPLC showed a decrease in the reflectance and peak maximum with respect to 0.06% AuNR. HPLC. This decrease may be due to the oversaturation of AuNR in the cubic lattice. Broadening of spectra peaks was noted as the concentration of AuNR was increased resulting from the non-uniform distribution of AuNR in the samples.

The electro-optical properties of the samples were investigated using 5/5/5 IPS cells. An applied voltage to the cells at a constant temperature of 50° C. shows the contrast between field-on and field-off states as seen in FIG. 3. The electro-optical study shows a reduction in the threshold voltage ($V_{th}$) of the doped 0.06% AuNR BP ($V_{th}$=27.3V) with respect to the pure HPLC ($V_{th}$=34.6V). The AuNR doped HPLC exhibits the same light transmission as that of the HPLC at the field-on state at a lower voltage. The POM images are the manifest of the transmittance versus applied voltage curves for both pure and doped HPLCs. With AuNR doping the HPLC is switched to a stripe domain at a low voltage where the field is applied in the direction normal to the stripes. The discontinued stripes arise from imperfect electrode patterning during the substrate preparation. By contrast, the disappearance of the stripe domain for pure. BP occurs at a higher voltage.

Figure 4A:
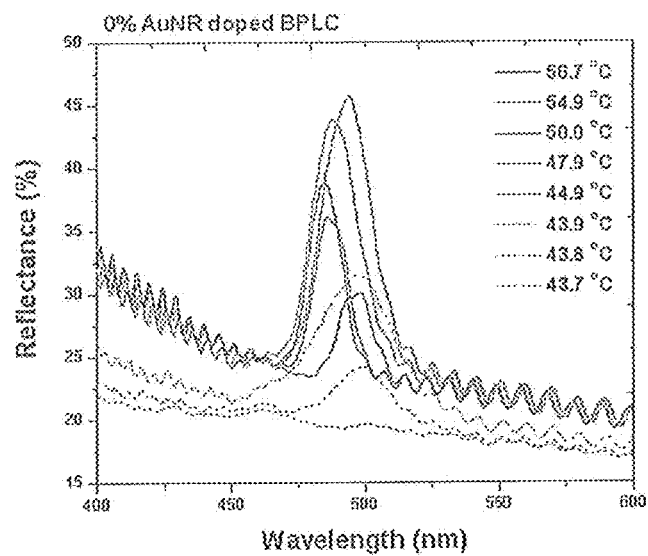
FIG. 4 shows the reflectance versus wavelength of pure HPLC (a) and 0.06% AuNR HPLC (b) as a function of temperature.
Figure 4B:
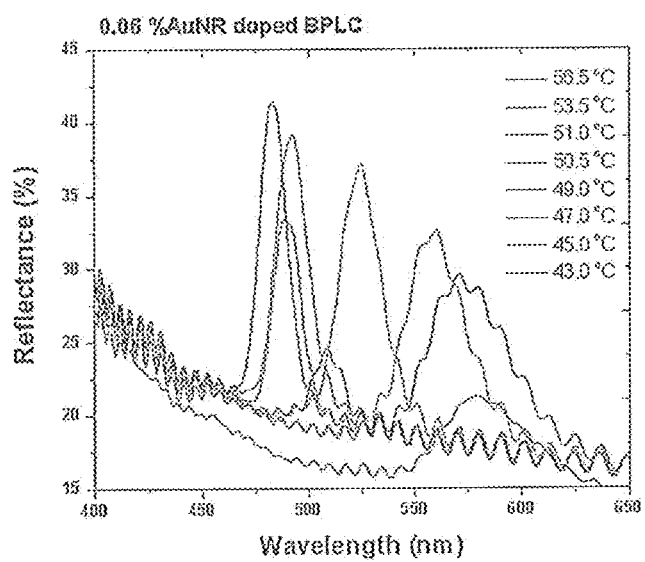

The reflection spectra were acquired with an Ocean Optics spectrometer as the temperature was varied. Spectral measurements were taken at increasing in temperature of pure HPLC and doped HPLC. FIG. 4 shows the pure HPLC and 0.06% AuNRs doped HPLC. The shift of reflection peak to longer wavelengths as decreasing in temperature indicates elongation of the HPLC cubic lattice.

While in accordance with the patent statutes the best mode and preferred embodiment have been set forth, the scope of the invention is not intended to be limited thereto, but only by the scope of the attached claims.

What is claimed is:

1. A blue phase liquid crystal composition, comprising:
a blend of:
at least one nematic liquid crystal
at least one chiral dopant in an amount from about 5 to about 90 parts by weight per 100 parts by weight of the nematic liquid crystal;
at least one nanorod in an amount from about 0.000001 to about 10 parts by weight per 100 parts by weight of the nematic liquid crystal and chiral dopant,
wherein said nanorods comprise an iron nanorod, a copper nanorod, a zinc nanorod, a silver nanorod, a gold nanorod, or a carbon nanotube, or any combination thereof.

2. The liquid crystal composition according to claim 1, wherein the composition further includes a mixture of a multifunctional monomer and a monofunctional monomer in a total amount from 0.01 percent to 80 percent by weight based on the total weight of the nematic liquid crystal and the chiral dopant; and a photoinitiator in an amount from 0.02 percent to 2 percent by weight of the total multifunctional monomer and monofunctional monomer.

3. The liquid crystal composition according to claim 1, wherein the amount of said dopant is from about 20 to 60 parts by weight per 100 parts by weight of the nematic liquid crystals; and wherein the amount of the nanorods is from about 0.001 to about 0.5 parts by weight per 100 parts by weight of the nematic liquid crystal and the chiral dopant.

4. The liquid crystal composition according to claim wherein the amount of said chiral dopant is from about 10 to about 70 parts by weight per 100 parts by weight of the nematic liquid crystal; and wherein the amount of the nanorods is from about 0.0001 to about 1.0 part by weight per 100 parts by weight of the nematic liquid crystal and the chiral dopant.

5. The liquid crystal composition according to claim 4, wherein said dopant comprises:

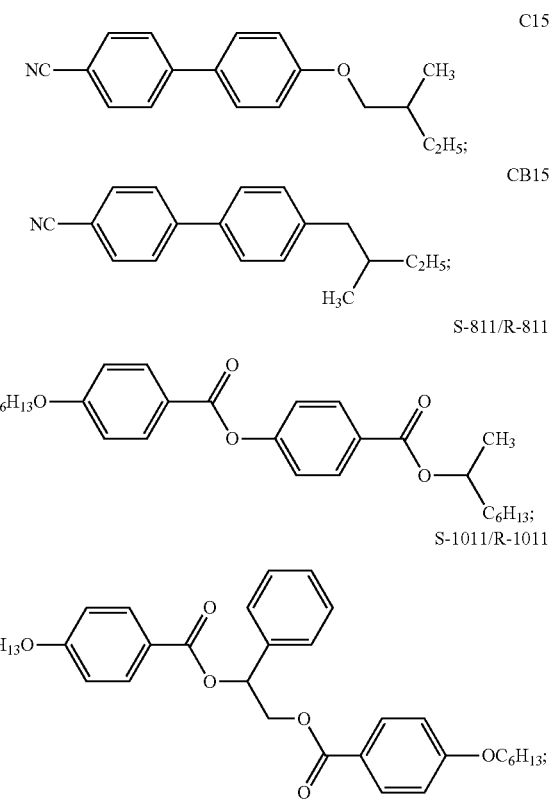

or any combination thereof.

6. The liquid crystal composition according to claim 5, wherein said nanorods comprise a silver nanorod, or a gold nanorod, or both.

7. The liquid crystal composition according to claim 4, wherein the multifunctional monomer comprises di-, tri-, tetra-, dipentaerythritol penta acrylate or methacrylate, vinyl ether, or vinyl acetate, and wherein the monofunctional monomer comprise alkyl-acrylate or alkyl-methacrylate wherein the alkyl group has from 1 to about 20 carbon atoms.

8. The liquid crystal composition according to claim 6, wherein the multifunctional monomer comprises di-, tri-, tetra-, dipentaerythritol penta acrylate or methacrylate, vinyl ether, or vinyl acetate, and wherein the monofunctional monomer comprises alkyl-acrylate or alkyl-methacrylate wherein the alkyl group has from 1 to about 20 carbon atoms.

9. A blue phase liquid crystal composition, comprising:
a nematic liquid crystal having a lattice structure doped with a chiral dopant, said liquid crystal having voids in said lattice structure, and nanorods located in said voids, wherein said nanorods comprise a metal oxide nanorod, a metallic nanorod, a semiconductor nanorod, or a carbon nanotube, or any combination thereof.

10. The liquid crystal composition according to claim 9, wherein the composition further includes a mixture of a multifunctional monomer and a monofunctional monomer in a total amount from 0.01 percent to 80 percent by weight based on the total weight of the nematic liquid crystal and the chiral dopant; and a photoinitiator in an amount from 0.02 percent to 2 percent by weight of the total multifunctional monomer and monofunctional monomer, and wherein said nanorods comprise an iron nanorod, a copper nanorod, a zinc nanorod, a silver nanorod, a gold nanorod, or a carbon nanotube, or any combination thereof.

11. The liquid crystal composition according to claim 9, wherein the amount of the chiral dopant is from about 5 to about 90 parts by weight per 100 parts by weight of the nematic liquid crystal; and wherein the amount of the nanorods is from about 0.000001 to about 10 parts by weight per 100 parts by weight of the nematic liquid crystal and the chiral dopant.

12. The liquid crystal composition according to claim 10, wherein the chiral dopant comprises:

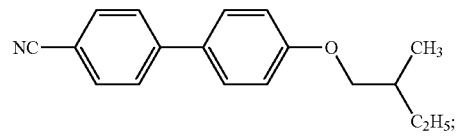

C15

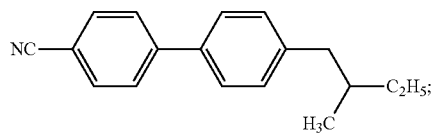

CB15

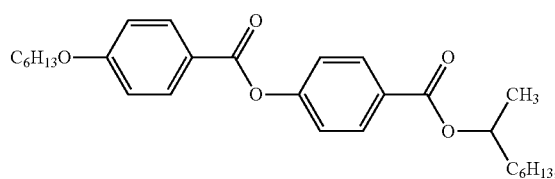

S-811/R-811

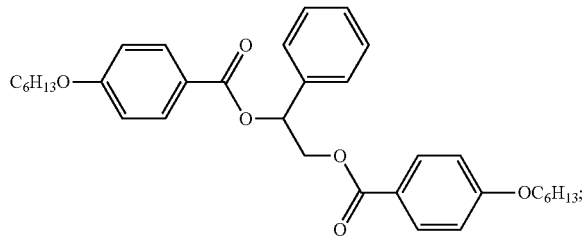

S-1011/R-1011 or any combination thereof; wherein said nanorods comprise a silver nanorod, a gold nanorod, or both.

13. The liquid crystal composition according to claim 12, wherein the amount of said chiral dopant is from about 10 to about 70 parts by weight per 100 parts by weight of the nematic liquid crystal; wherein the amount of the nanorods is from about 0.0001 to about 1 part by weight per 100 parts by weight of the nematic liquid crystal and the chiral dopant; wherein the multifunctional monomer comprises di-, tri-, tetra-, dipentaerythritol penta acrylate or methacrylate, or vinyl ether, or vinyl acetate, and wherein the monofunctional monomer comprises alkyl-acrylate or alkyl-methacrylate wherein the alkyl group has from 1 to about 20 carbon atoms.

14. An electro-optical device, comprising:
a pair of spaced apart substrates having an electrode layer on one of said substrates, comprising:
a liquid crystal composition located between said substrates, said liquid crystal composition comprising:
at least one nematic liquid crystal and at least one chiral dopant in an amount from about 5 to about 90 parts by weight per 100 parts by weight of the nematic liquid crystal; at least one nanorod in an amount from about 0.000001 to about 10 parts by weight per 100 parts by weight of the nematic liquid crystal and chiral dopant, wherein said nanorods comprise an iron nanorod, a copper nanorod, a zinc nanorod, a silver nanorod, a gold nanorod, or a carbon nanotube any combination thereof.

15. The electro-optical device according to claim 14, wherein the composition further includes a mixture of a multifunctional monomer and a monofunctional monomer in a total amount from 0.01 percent to 80 percent by weight based on the total weight of the nematic liquid crystal and the chiral dopant, and a photoinitiator in an amount from 0.02 percent to 2 percent by weight of the total multifunctional monomer and monofunctional monomer.

16. The electro-optical device according to claim 14, wherein said dopant comprises:

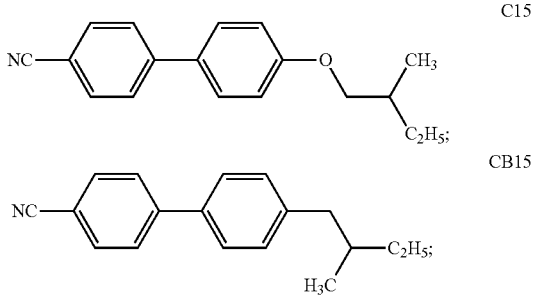

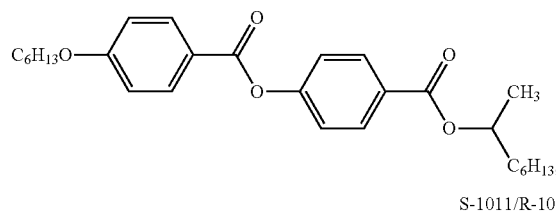

S-811/R-811

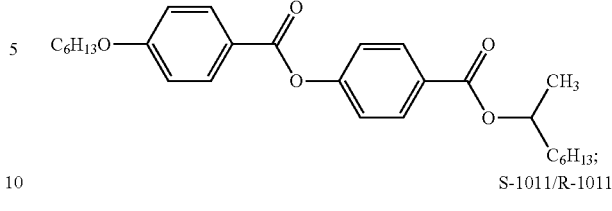

S-811/R-811

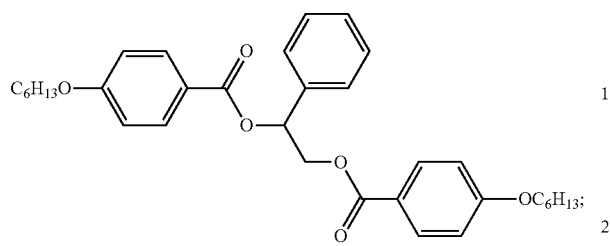

S-1011/R-1011

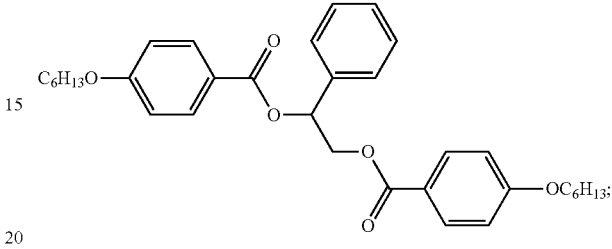

S-1011/R-1011 or any combination thereof; and wherein the nanorods comprise a silver nanorod, a gold nanorod, or any combination thereof.

17. The electro-optical device according to claim 15, wherein the dopant comprises:

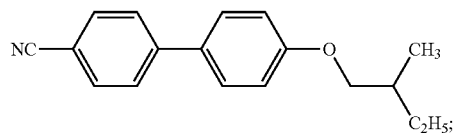

C15

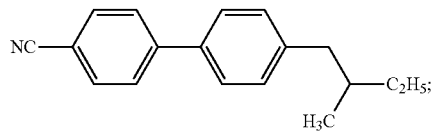

CB15 or any combination thereof; wherein the multifunctional monomer comprises di-, tri-, tetra-, dipentaerythritol penta acrylate or methacrylate, or vinyl ether, or vinyl acetate, and wherein the monofunctional monomer comprises alkyl-acrylate or alkyl-methacrylate, wherein the alkyl group has from 1 to about 20 carbon atoms.

18. The electro-optical device according to claim 17, wherein the amount of chiral dopant is from about 20 to 60 parts by weight per 100 parts by weight of the nematic liquid crystal; and wherein the amount of the nanorods is from about 0.001 to about 0.5 parts by weight per 100 parts by weight of the nematic liquid crystal and the chiral dopant.

19. The electro-optical device according to claim 16, wherein said electro-optical device comprises and electrical-driven liquid crystal spatial light modulator, a lens, a lens array, photonic crystal fibers, an active optical element, or an active optical display.

20. The electro-optical device according to claim 18, wherein said electro-optical device comprises and electrical-driven liquid crystal spatial light modulator, a lens, a lens array, photonic crystal fibers, an active optical element, or an active optical display.

* * * * *

UNITED STATES PATENT AND TRADEMARK OFFICE
CERTIFICATE OF CORRECTION

PATENT NO. : 8,580,144 B2  
APPLICATION NO. : 13/441027  
DATED : November 12, 2013  
INVENTOR(S) : Liang-Chy Chien et al.

It is certified that error appears in the above-identified patent and that said Letters Patent is hereby corrected as shown below:

In the Claims

In column 12, claim 4, line 21, the claim dependency has been omitted, as claim 4 is dependent on claim 2.

--The liquid crystal composition according to claim 2, wherein....--

Signed and Sealed this  
Twenty-eighth Day of January, 2014

Michelle K. Lee  
*Deputy Director of the United States Patent and Trademark Office*